(12) United States Patent
Fontana

(10) Patent No.: US 9,371,907 B2
(45) Date of Patent: Jun. 21, 2016

(54) SHIFT RAIL INHIBITOR MECHANSIM FOR A TRANSMISSION

(71) Applicant: Eaton Corporation, Cleveland, OH (US)

(72) Inventor: Carlos Fontana, Itatiba (BR)

(73) Assignee: Eaton Corporation, Cleveland, OH (US)

( * ) Notice: Subject to any disclaimer, the term of this patent is extended or adjusted under 35 U.S.C. 154(b) by 371 days.

(21) Appl. No.: 14/105,858

(22) Filed: Dec. 13, 2013

(65) Prior Publication Data

US 2014/0165766 A1    Jun. 19, 2014

Related U.S. Application Data

(60) Provisional application No. 61/910,476, filed on Dec. 2, 2013, provisional application No. 61/908,781, filed on Nov. 26, 2013, provisional application No. 61/736,691, filed on Dec. 13, 2012.

(51) Int. Cl.
    *F16H 59/02*      (2006.01)
    *F16H 63/36*      (2006.01)

(52) U.S. Cl.
    CPC ........... *F16H 63/36* (2013.01); *Y10T 74/20104* (2015.01)

(58) Field of Classification Search
    CPC .... F16H 63/36; F16H 63/38; Y10T 74/20104
    See application file for complete search history.

(56) References Cited

U.S. PATENT DOCUMENTS

| | | | | |
|---|---|---|---|---|
| 4,539,447 | A * | 9/1985 | Mizutani | B60K 17/344 200/61.91 |
| 5,950,492 | A * | 9/1999 | Crawford | F16H 63/32 192/48.91 |
| 7,597,024 | B2 * | 10/2009 | Matsuda | F16H 63/20 74/473.36 |
| 8,171,817 | B2 * | 5/2012 | Lee | F16H 63/3408 74/473.25 |
| 8,397,598 | B2 * | 3/2013 | Garabello | F16H 63/30 74/335 |
| 9,121,499 | B2 * | 9/2015 | Kelpe | F16H 61/30 |
| 2011/0061487 | A1 * | 3/2011 | Tooman | F16H 63/3023 74/473.36 |
| 2012/0304794 | A1 * | 12/2012 | Beer | F16H 63/3408 74/473.36 |

* cited by examiner

*Primary Examiner* — David M Fenstermacher
(74) *Attorney, Agent, or Firm* — Fishman Stewart PLLC

(57) ABSTRACT

An inhibitor mechanism may include at least one first primary interlocking element and at least one second primary interlocking element each configured to selectively engage with a shift rail in at least one cavity of the shift rail to inhibit the axial movement of the respective shift rail. The inhibitor mechanism may also include at least one secondary interlocking element in contact with the at least one first primary interlocking element, and may be configured to selectively engage with another shift rail in the at least one cavity to inhibit the axial movement of that shift rail. Only one of the primary interlocking elements and the at least one secondary interlocking element may be movable to outside of the at least one cavity of the respective shift rail at one time such that only that respective shift rail is movable in the axial direction.

20 Claims, 3 Drawing Sheets

SHIFT RAIL INHIBITOR MECHANSIM FOR A TRANSMISSION

CROSS-REFERENCE TO RELATED APPLICATIONS

This application claims the benefit of U.S. Provisional Application 61/736,691, filed on Dec. 13, 2012, U.S. Provisional Application 61/908,781, filed on Nov. 26, 2013, and U.S. Provisional Application 61/910,476, filed on Dec. 2, 2013, which are hereby incorporated by reference in their entirety.

BACKGROUND

Manual compound transmissions are generally positioned within a driveline adjacent a primary drive unit with at least one rotating drive shaft. These compound transmissions generally include a shifter or gear selector that extends from the transmission for interaction with an operator. The compound transmission may include a rotating and sliding assembly that is configured to engage a desired gear set when an operator moves the shifter or gear selector. Specifically, in a manual compound transmission, an operator, through the gear selector, selects an appropriate gear by pushing or pulling the shift lever to a desired shift gate. A rail selector fixed to a main shift rail is configured to translate the movement of the shift lever to shift rails and shift forks, which causes a shift collar to slide over the appropriate rotating gear to synchronize and activate a desired gear range.

In such manual compound transmissions, it is typically desirable that only one shift rail be permitted to move from its neutral position at any one time to prevent damage to the gearing and/or clutch components. Accordingly, most manual transmissions incorporate some type of interlock mechanisms to inhibit movement of more than one shift rail at a given time. In most interlock mechanisms, movement of any one of the shift rails from its neutral position actuates a locking component which in turn is coupled to block any axial movement of the other shift rails until the one shift rail has been returned to a neutral position.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

A transmission may include a plurality of shift rails to engage the transmission in a particular gear range. Each shift rail may be configured to move axially and may define at least one cavity. It may be desirable to have only one shift rail move axially at one time. To accomplish this, the transmission may incorporate an inhibitor mechanism.

An exemplary inhibitor mechanism may include at least one first primary interlocking element and at least one second primary interlocking element each configured to selectively engage with one of the plurality of shift rails in the at least one cavity to substantially inhibit the respective shift rail from moving axially. The exemplary inhibitor mechanism may also include at least one secondary interlocking element in selective contact with at least one of the at least one first primary interlocking element and the at least one second primary interlocking element, where the at least one secondary interlocking element may be configured to selectively engage with another of the plurality of shift rails to substantially inhibit the shift rail from moving axially. The exemplary inhibitor mechanism may further include a spacing mechanism in contact with the at least one first primary interlocking element and the at least one second primary interlocking element, where the spacing mechanism may be configured to enable the movement of at least one of the at least one first primary interlocking element, the at least one second primary interlocking element, and the at least one secondary interlocking element. The inhibitor mechanism may be configured such that only one of the at least one first primary interlocking element, the at least one second primary interlocking element, and the at least one secondary interlocking element may be movable to outside of the at least one cavity of the respective shift rail at one time such that only that respective shift rail is movable in the axial direction.

Figure 1:
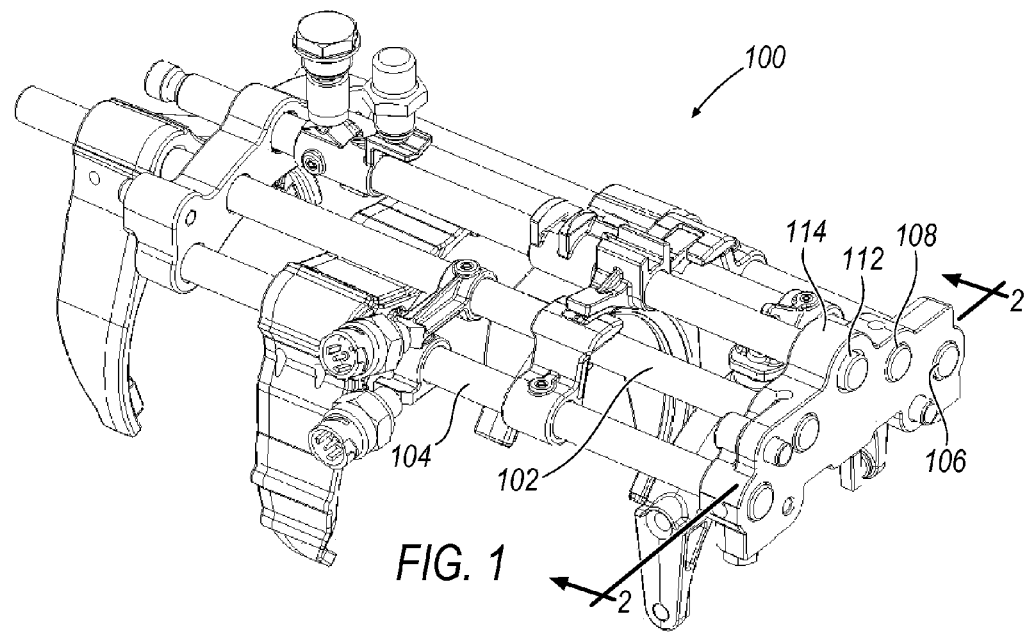
FIG. 1 is a schematic, perspective view of a plurality of shift rails of an exemplary transmission.

Referring now to FIG. 1, a portion of a transmission 100 for a vehicle is shown. The transmission 100 generally may include a first shift rail 102, a second shift rail 104, a third shift rail 106, and a fourth shift rail 108 each configured to move axially to engage the transmission 100 in a particular gear range. Each shift rail 102, 104, 106, and 108 may correspond to one or two gear ranges. For example, for a six-speed transmission as depicted in FIG. 1, the first shift rail 102 may be used to place the transmission 100 in first gear or second gear, the second shift rail 104 for third gear or fourth gear, the third shift rail 106 for fifth gear or sixth gear, and the shift rail 108 for reverse. The transmission 100 alternatively may be a five-speed transmission in which the third shift rail 104 may be for fifth gear and reverse, and therefore, may not require the fourth shift rail 108. When none of the gears are engaged, the transmission 100 generally may be in a neutral position. It should be appreciated that the transmission 100 may include any number of shift rails.

The transmission 100 may also include a main shift rail 112 configured to engage with one of the shift rails 102, 104, 106, and 108 to move them axially. The main shift rail 112 generally may be connected to a shift lever (not shown) for use by an operator of the vehicle to control the main shift rail 112 to select the desired gear range.

The shift rails 102, 104, 106, 108, and 112 may be supported by a support plate 114 at a front end and/or at a rear end such that they may all be substantially parallel to each other. The support plate 114 may incorporate an inhibitor mechanism 10, as depicted in FIGS. 2 through 5, to substantially inhibit more than one shift rail 102, 104, 106, 108 from moving in the axial direction.

Referring now to FIGS. 2 through 5, the inhibitor mechanism 10 generally may have a first set of primary interlocking elements 12 and a second set of primary interlocking elements 14 positioned transverse to the second and third shift rails 104 and 106 and substantially linear with respect to each other. The first set of primary interlocking elements 12 may be configured to engage with the second shift rail 104, and the second set of primary interlocking elements 14 with the third shift rail 106, to control their axial movement, as described in more detail hereinafter. The support plate 114 may define a first channel 116 and a second channel 118 within which the primary interlocking elements 12 and 14, respectively, may be located, and which may allow for lateral movement of the primary interlocking elements 12 and 14. The first channel 116 and the second channel 118 may be substantially aligned linearly and transverse to the shift rails 102, 104, 106, and 108. While FIG. 1 illustrates three primary interlocking elements 12 and 14 in the first set and second set, it should be appreciated that there may be any number, which may be dependent upon such factors as the size of the interlocking elements 12 and 14, the spacing of the shift rails 102, 104, 106, and 108, and the like.

The inhibitor mechanism 10 may also include a first secondary interlocking element 16 and a second secondary interlocking element 18 in selective contact with the first set of primary interlocking elements 12 and the second set of primary interlocking elements 14, respectively. The first and second secondary interlocking elements 16 and 18 may be configured to engage with the first shift rail 102 and the fourth shift rail 108, respectively, to control their axial movement, as described in more detail hereinafter. It should be appreciated that in approaches in which the transmission 100 is a five-speed transmission and therefore may not have the fourth shift rail 108, as explained above, the inhibitor mechanism 10 may not require the second secondary interlocking element 18. The secondary interlocking elements 16 and 18 may be positioned substantially perpendicular to the first and second set of primary interlocking elements 12 and 14. The support plate 114 may define a third channel 120 and a fourth channel 122 within which the secondary interlocking elements 16 and 18, respectively, may be located, and which may allow for longitudinal or downward movement of the secondary interlocking elements 16 and 18. The third channel 120 and the fourth channel 122 may be arranged substantially perpendicular to the first channel 116 and the second channel 118, respectively. While FIG. 1 illustrates only one first secondary interlocking element 16 and one second secondary interlocking element 18 for the first shift rail 102 and the fourth shift rail 108, respectively, it should be appreciated that there may be any number of secondary interlocking elements 16 and 18 for each shift rail 102 and 108, respectively, which may be dependent upon such factors as the size of the interlocking elements 16 and 18, the spacing of the shift rails 102, 104, 106, and 108, and the like.

The primary interlocking elements 12 and 14 and the secondary interlocking elements 16 and 18 generally may be any shape that may allow for substantially linear movement within the channels 116, 118, 120, and 122. In one exemplary approach, the interlocking elements 12, 14, 16, and 18 may be substantially spherical in shape, such as a ball. This may minimize the contact area between the interlocking elements 12, 14, 16, and 18 with the respective channels 116, 118, 120, and 122, thereby minimizing the friction and enhancing their movement. In addition, the substantially spherical shape may also minimize the point of contact between each of the interlocking elements 12, 14, 16, and 18, thereby allowing for tighter tolerances within the respective channels 116, 118, 120, and 122.

The inhibitor mechanism 10 may further include a spacing mechanism 19 configured to enable the movement of the primary interlocking elements 12 and 14 and the secondary interlocking elements 16 and 18. The spacing mechanism 19 may include a pair of spacer pins 20, one of which is at least partially disposed within the first channel 116 and in contact with the first set of primary interlocking elements 12, and the other at least partially disposed within the second channel 118 and in contact with the second set of primary interlocking elements 14. The spacer pins 20 may be connected by a biasing mechanism 22, such as a single spring, configured to bias the spacer pins 20 to have a gap between them, but to enable the spacer pins 20 to come into contact with each other when any of the primary interlocking elements 12 and 14 or the secondary interlocking elements 16 and 18 move, as described hereinafter. A single spring may allow the spacer pins 20 to be self-centering between the first set of primary balls 12 and the second set of primary balls 14, which may provide consistent forces on both spacer pins 20, and therefore on the primary balls 12 and 14. However, it should be appreciated that the biasing mechanism 22 may include more than one spring such that each spacer pin 20 is connected to at least one spring. The spacer pins 20 may each include a stem 21 configured to receive the biasing mechanism 22, which may help align the spacer pins 20 within their respective channels 116 and 118. This may further provide support to the biasing mechanism 22, thereby minimizing undesired movement of the biasing mechanism 22 and/or the spacer pins 20 and substantially constraining the movement to the lateral direction.

Figure 2:
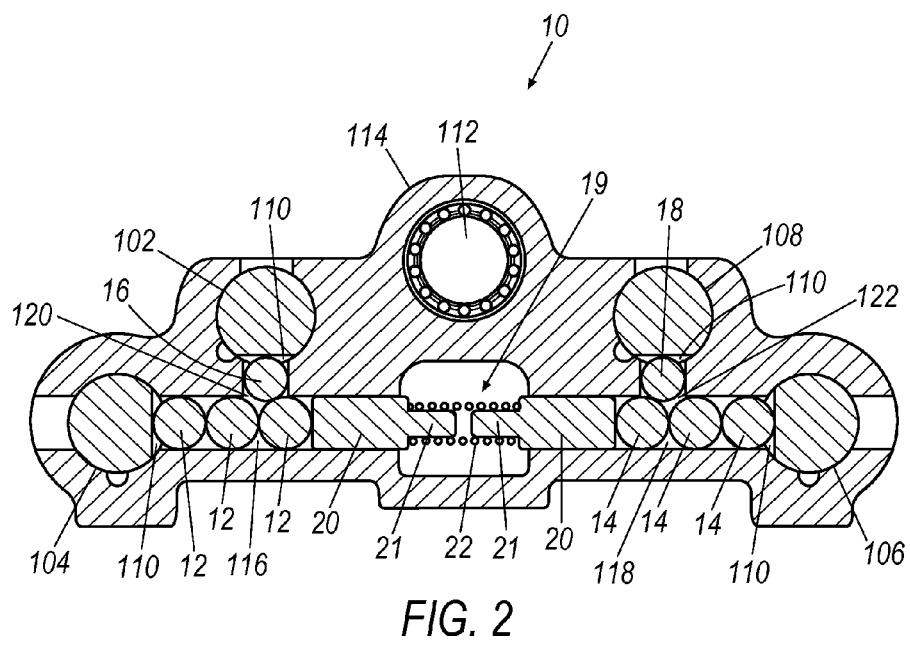
FIG. 2 is a schematic, front cross-sectional view of the exemplary transmission of FIG. 1 illustrating an exemplary inhibitor mechanism with the shift rails in a neutral position.

The shift rails 102, 104, 106, and 108 may each define at least one cavity 110 in which at least a portion of one of the respective interlocking elements 12, 14, 16, and 18 may selectively fit. When the transmission 100 and the shift rails 102, 104, 106, and 108 are in a neutral position, the interlocking elements 12, 14, 16, and 18 may be positioned within the cavities 110 of the respective shift rails 102, 104, 106, and 108, as seen in FIG. 2. In addition, the spacer pins 20 may be spaced apart to maintain the interlocking elements 12, 14, 16, and 18 to be positioned within the cavities 110.

When one of the shift rails 102, 104, 106, or 108 begins to move axially such that it is no longer inhibited, the respective interlocking element 12, 14, 16, or 18 within its cavity 110 may begin to be pushed out of the cavity 110. To enable the movement of the interlocking 12, 14, 16, or 18, the biasing mechanism 22 may begin to compress, thereby moving the spacer pins 20 together until the ball 12, 14, 16, or 18 is completely out of the cavity 110, and the spacer pins 20 are in contact with each other, i.e., no space remains between them. Where the interlocking elements 12, 14, 16, and 18 may be substantially spherical in shape, as explained above, the cavities 110 may be grooves or substantially concave. Thus, when one of the shift rails 102, 104, 106, or 108 moves axially, the substantially concave shape of the cavity 110 and spherical shape of the interlocking element 12, 14, 16, or 18 may ease the transition out of the cavity 110.

Figure 3:
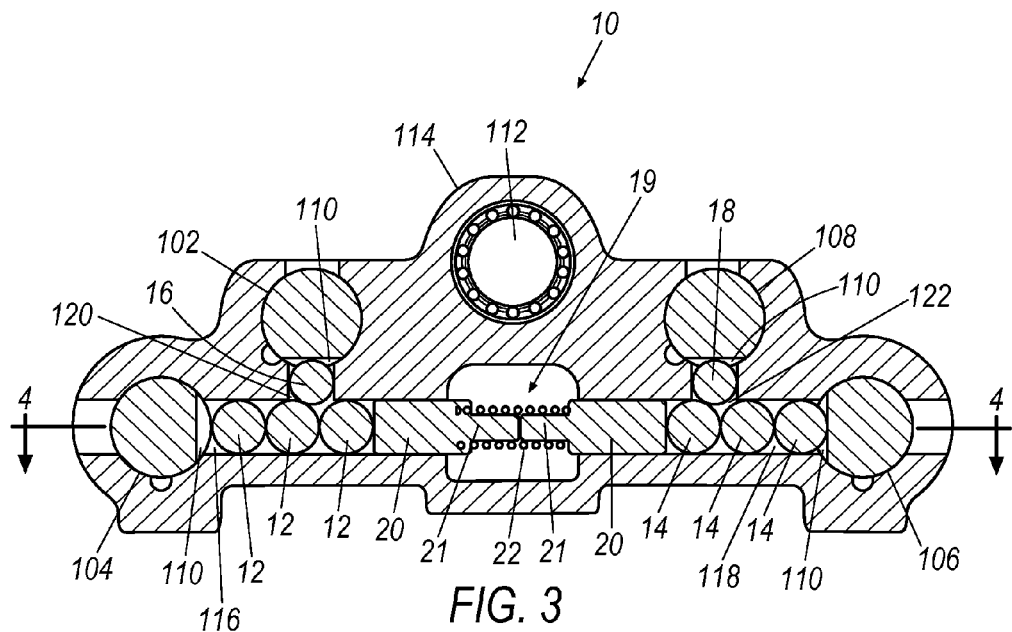
FIG. 3 is a schematic, front cross-sectional view illustrating the exemplary inhibitor mechanism of FIG. 2 with one of the shift rails in an uninhibited position.
Figure 4:
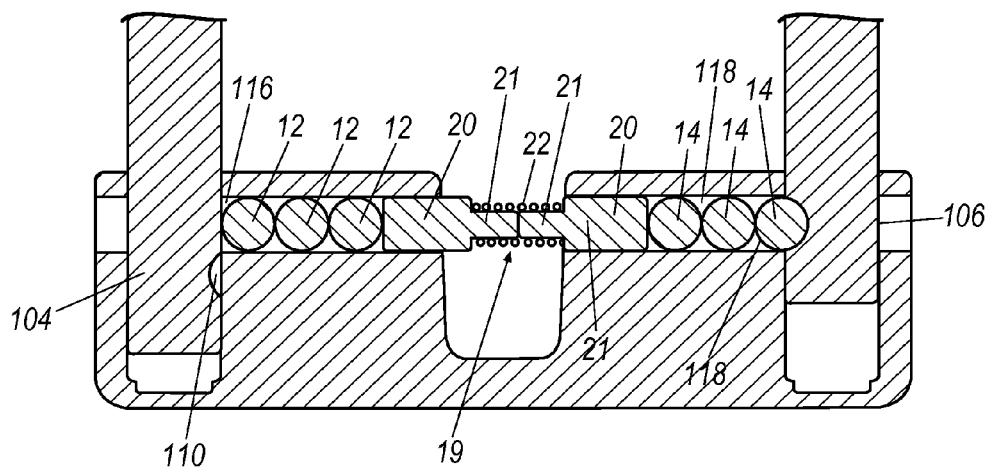
FIG. 4 is a schematic, cross-sectional view of the inhibitor mechanism of FIG. 3.

Referring now to FIGS. 3 and 4 as an example, when the second shift rail 104 moves axially, the first set of primary interlocking elements 12 may be pushed transversely toward the spacer pins 20 until they are touching, as explained above. Because of this, the second set of primary interlocking elements 14 are forced to remain within the cavity 110 of the third shift rail 106 as there is no available space for them to likewise move transversely. Similarly, the secondary interlocking elements 16 and 18 are forced to remain in the grooves 110 of the first shift rail 102 and the fourth shift rail 108, respectively. As such, the shift rails 102, 106, and 108 may be substantially inhibited from moving axially when the second shift rail 104 is uninhibited.

Figure 5:
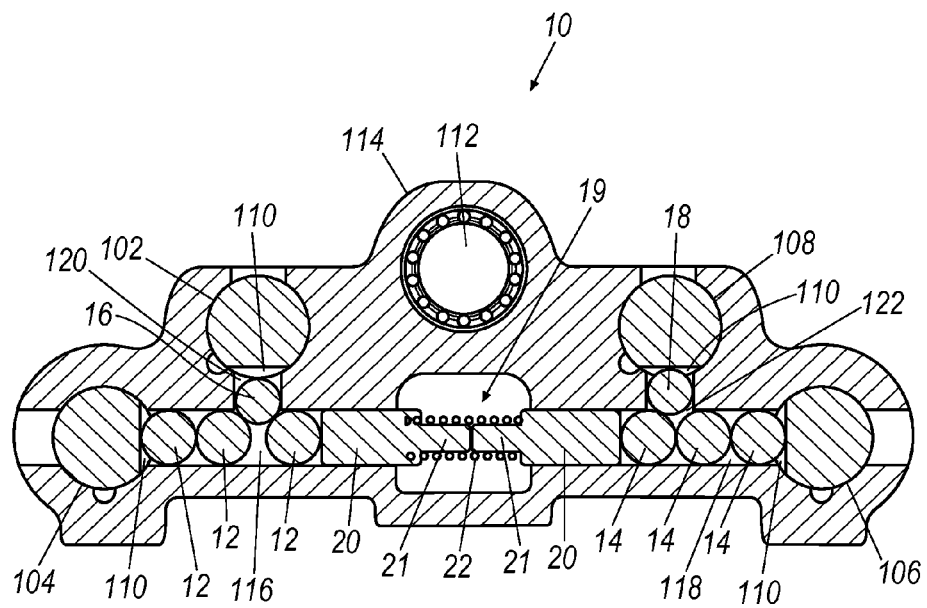
FIG. 5 is a schematic, front cross-sectional view illustrating the exemplary inhibitor mechanism of FIG. 2 with another shift rail in an uninhibited position.

Referring now to FIG. 5, the inhibitor mechanism 10 is shown when one of the shift rails 102 or 108 is uninhibited. As an example, when the first shift rail 102 is moving axially and is uninhibited, the inhibitor mechanism 10 may substantially inhibit the axial movement of the shift rails 104, 106, and 108 when the first shift rail 102 is moving axially and is uninhibited. When the first shift rail 102 moves axially, it pushes the first secondary interlocking element 16 downward or longitudinally toward the first set of primary interlocking elements 12. This forces at least one of the primary interlocking elements 12 toward the spacer pins 20 until there is no space between them. The remaining primary interlocking elements 12 and 14 and the secondary interlocking element 18 remain in the cavities 110 of the respective shift rails 104, 106, and 108, thereby substantially inhibiting their axial motion.

Figure 6:
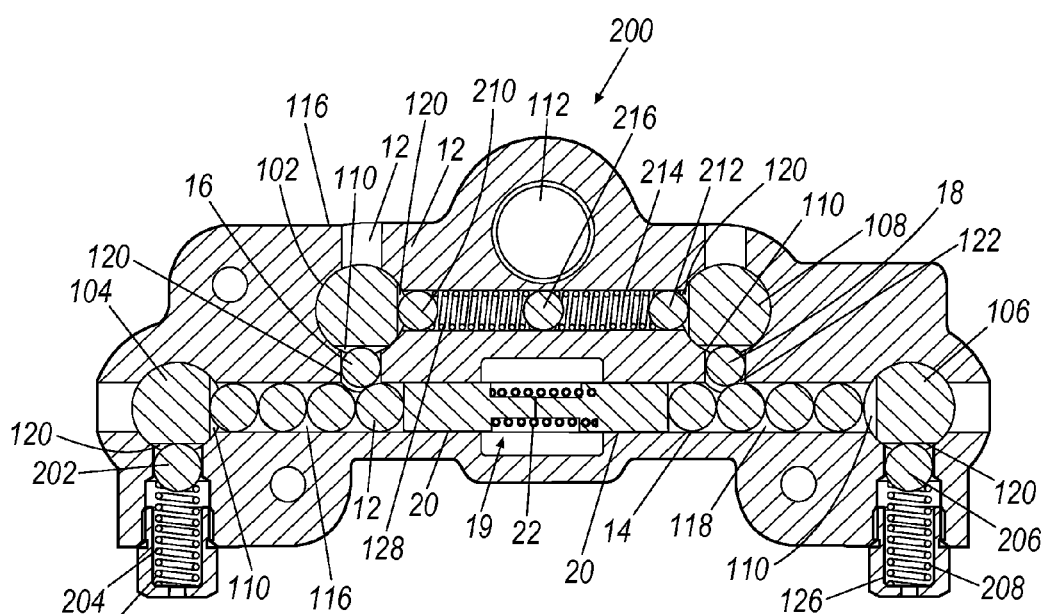
FIG. 6 is a schematic, front cross-sectional view illustrating of the exemplary transmission of FIG. 1 illustrating the inhibitor mechanism according to another exemplary approach.

Referring now to FIG. 6, another exemplary inhibiting mechanism 200 is shown. The inhibiting mechanism 200 generally may include the elements of the inhibiting mechanism 10 described above. The inhibiting mechanism 200 may also be integrated within the support plate 114. In addition, the shift rails 102, 104, 106, and 108 may each have a first cavity 110 and a second cavity 120 set substantially perpendicular to each other. As with the first cavity 110, the second cavity 120 may be a groove or substantially concave. This may allow for double engagement of each of the shift rails 102, 104, 106, and 108, as described in more detail below.

The inhibiting mechanism 200 may include a first spring-mounted detent ball 202 configured to engage with the second shift rail 104 in the second cavity 120 to further inhibit the second shift rail 104 from moving axially. The first spring-mounted detent ball 202 may be connected to a first detent spring 204 configured to bias the first spring-mounted detent ball 202 to be at least partially positioned within the second cavity 120 of the second shift rail 104. When the second shift rail 104 is moved axially, the first detent spring 204 may compress such that the first spring-mounted detent ball 202 may be pushed out of the second cavity 120. The support plate 114 may define a channel 124 extending from the location of the groove 120 in the neutral position. The first detent spring 204 and the first spring-mounted detent ball 202 may be disposed within the channel 124 to allow the movement of the first spring-mounted detent ball 202 into and out of the second cavity 120.

Similarly, the inhibiting mechanism 200 may include a second spring-mounted detent ball 206 configured to engage with the third shift rail 106 to further inhibit the third shift rail 106 from moving axially. The second spring-mounted detent ball 206 may be connected to a second detent spring 208 configured to bias the second spring-mounted detent ball 206 to be at least partially positioned within the second cavity 120 of the third shift rail 106. As with the second shift rail 104, when the third shift rail 106 is moved axially, the second detent spring 208 may compress such that the second spring-mounted detent ball 206 may be pushed out of the second cavity 120. The support plate 114 may define a channel 126 extending from the location of the second cavity 120 in the neutral position. The second detent spring 208 and the second spring-mounted detent ball 206 may be disposed within the channel 126 to allow the movement of the second spring-mounted detent ball 206 into and out of the second groove 120.

The inhibiting mechanism 200 may further include a third spring-mounted detent ball 210 and a fourth spring-mounted detent ball 212 connected to a third detent spring 214. The third spring-mounted detent ball 210 and the fourth spring-mounted detent ball 212 may be configured to engage with the second cavities 120 of the first shift rail 102 and the fourth shift rail 108, respectively, to selectively inhibit them from substantially moving axially. The third detent spring 214 may be configured to bias the third spring-mounted detent ball 210 and the fourth spring-mounted detent ball 212 to at least partially be positioned within the second cavities 120 of the first shift rail 102 and the fourth shift rail 108, respectively. The inhibiting mechanism 200 may also include a fifth spring-mounted detent ball 216 positioned in approximately the center of the third detent spring 214. When either of the first shift rail 102 or the fourth shift rail 108 move laterally, the third detent spring 214 may compress such that the respective spring-mounted detent ball 210 or 212 may be pushed out of the second cavity 120. The support plate 114 may further define a channel 128 connecting the location of the second cavities 120 of the first shift rail 102 and the second shift rail 108 in the neutral position, and within which the third spring-mounted detent ball 210, the fourth spring-mounted detent ball 212, the fifth-spring mounted detent ball 216, and the third detent spring 214 may be disposed.

It should be appreciated that the spring-mounted detent balls 202, 206, 210, 212, and 214 may be any non-spherical shape that may enable linear movement in the channels 124, 126, and 128.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An inhibitor mechanism for a transmission having a plurality of shift rails, each shift rail defining at least one cavity and being configured to move in an axial direction, the inhibitor mechanism comprising:
   at least one first primary interlocking element and at least one second primary interlocking element each configured to selectively engage with one of the plurality of shift rails in the at least one cavity to substantially inhibit the respective shift rail from moving axially;
   at least one secondary interlocking element in selective contact with at least one of the at least one first primary interlocking element and the at least one second interlocking element, the at least one secondary interlocking element being configured to selectively engage with another of the plurality of shift rails in the at least one cavity to substantially inhibit the shift rail from moving axially;
   a spacing mechanism in contact with the at least one first primary interlocking element and the at least one second primary interlocking element, the spacing mechanism being configured to enable the movement of at least one of the at least one first primary interlocking element, the at least one second primary interlocking element, and the at least one secondary interlocking element;
   wherein only one of the at least one first primary interlocking element, the at least one second primary interlocking element, and the at least one secondary interlocking element is movable to outside of the at least one cavity of the respective shift rail at one time such that only that respective shift rail is movable in the axial direction.

2. The inhibitor mechanism of claim 1 wherein the spacing device comprises a first spacer pin in contact with the at least one first primary interlocking element, and a second spacer pin in contact with the at least one second primary interlocking element, and at least one biasing mechanism configured to bias the first spacer pin and the second spacer pin to have a space between them such that the at least one first primary interlocking element, the at least one second primary interlocking element, and the at least one secondary interlocking element are positionable within the at least one cavity of the respective shift rails.

3. The inhibitor mechanism of claim 2 wherein the at least one biasing mechanism is at least one spring connected to at least one of the first spacer pin and the second spacer pin.

4. The inhibitor mechanism of claim 1 wherein at least one of the at least one first primary interlocking element, the at least one second primary interlocking element, and the at least one secondary interlocking element is a ball.

5. The inhibitor mechanism of claim 1 further comprising an additional secondary interlocking element in contact with the other of the at least one first primary ball and the at least one second primary ball, the additional secondary interlocking element being configured to selectively engage with an additional shift rail and to substantially inhibit the additional shift rail from moving axially.

6. A transmission comprising:
   a first shift rail, a second shift rail, and a third shift rail, each configured to move in an axial direction and each defining at least one cavity; and
   an inhibitor mechanism having:
      at least one first primary interlocking element and at least one second primary interlocking element configured to engage with the second shift rail and the third shift rail, respectively, to selectively substantially inhibit the respective shift rails from moving axially;
      at least one secondary ball in selective contact with at least one of the at least one first primary interlocking element and the at least one second primary interlocking element, the at least one secondary interlocking element being configured to selectively engage with the first shift rail to substantially inhibit the first shift rail from moving axially;
      a spacing mechanism in contact with the at least one first primary interlocking element and the at least one second primary interlocking element, the spacing mechanism being configured to enable the movement of at least one of the at least one first primary interlocking element, the at least one second primary interlocking element, and the at least one secondary interlocking element;
      wherein only one of the at least one first primary interlocking element, the at least one second primary interlocking element, and the at least one secondary interlocking element is movable to outside of the at least one cavity of the respective shift rail at one time such that only that respective shift rail is movable in the axial direction.

7. The transmission of claim 6 further comprising at least one support plate configured to maintain the shift rails substantially parallel to each other.

8. The transmission of claim 7 wherein the inhibitor mechanism is integrated substantially within the at least one support plate.

9. The transmission of claim 8 wherein the at least one support plate defines a first channel in which the at least one first primary interlocking element is movable into and out of the at least one cavity of the second shift rail, a second channel in which the at least one second primary interlocking element is movable into and out of the at least one cavity of the third shift rail, and a third channel in which the at least one secondary interlocking element is movable into and out of the at least one cavity of the first shift rail.

10. The transmission of claim 9 wherein the first channel and the second channel are substantially aligned linearly and transverse to the shift rails, and the third channel is substantially perpendicular to the first channel and the second channel.

11. The transmission of claim 6 wherein at least one of the at least one first primary interlocking element, the at least one second primary interlocking element, and the at least one secondary interlocking element is a ball.

12. The transmission of claim 11 wherein at least one of the at least one cavities of the shift rails is a groove.

13. The transmission of claim 6 wherein the spacing device comprises a first spacer pin in contact with the at least one first primary interlocking element, and a second spacer pin in contact with the at least one second primary interlocking element, and at least one biasing mechanism configured to bias the first spacer pin and the second spacer pin to have a space between them such that the at least one first primary interlocking element, the at least one second primary interlocking element, and the at least one secondary interlocking element are positionable within the at least one cavity of the respective shift rails.

14. The transmission of claim 6 wherein the at least one biasing mechanism is at least one spring connected to at least one of the first spacer pin and the second spacer pin.

15. The transmission of claim 6 further comprising a fourth shift rail.

16. The transmission of claim 15 wherein the inhibitor mechanism further comprises at least one additional secondary interlocking element in contact with the other of the at least one first primary ball and the at least one second primary interlocking element, the at least one additional secondary interlocking element being configured to selectively engage with the fourth shift rail to substantially inhibit the fourth shift rail from moving axially.

17. The transmission of claim 6 wherein at least one of the first shift rail, the second shift rail, and the third shift rail further defines a second cavity positioned substantially perpendicular to the at least one cavity.

18. The transmission of claim 17 wherein the inhibitor mechanism further comprises at least one detent ball configured to selectively engage with the second cavity of at least one of the first shift rail, the second shift rail, and the third shift rail to substantially inhibit the at least one of the first shift rail, the second shift rail, and the third shift rail from moving axially.

19. The transmission of claim 18 wherein the inhibitor mechanism further comprises at least one detent spring operatively attached to the at least one detent ball, the at least one detent spring being configured to bias the at least one detent ball into the second cavity in the neutral position.

20. A transmission comprising:
   a first shift rail, a second shift rail, a third shift rail, and a fourth shift rail each configured to move in an axial direction and each defining at least one groove; and
   an inhibitor mechanism having:
      a first set of primary balls, one of which is configured to selectively engage with the second shift rail in the at least one groove;
      a second set of primary balls, one of which is configured to selectively engage with the third shift rail in the at least one groove;
      at least one first secondary ball in contact with at least one of the first set of primary balls, the at least one first secondary ball being configured to selectively engage with the first shift rail in the at least one groove;
      at least one second secondary ball in contact with at least one of the second set of primary balls, the at least one second secondary ball being configured to selectively engage with the fourth shift rail in the at least one groove;
      a first spacer pin and a second spacer pin in contact with one of the first set of primary balls and one of the second set of primary balls, respectively, the first spacer pin and the second spacer pin being connected by a spring configured to bias the first spacer pin and the second spacer pin to have a space between them, and to compress to enable the first spacer pin and the second spacer pin to come into contact with each other;
   wherein only one of the first set of primary balls, the second set of primary balls, the at least one first secondary ball, and the at least one second secondary ball is movable to outside of the at least one groove of the respective shift rail at one time such that only that respective shift rail is movable in the axial direction.

* * * * *